(No Model.)
G. H. CORMACK.
PROCESS OF AND APPARATUS FOR HULLING OATS.
No. 268,782. Patented Dec. 12, 1882.
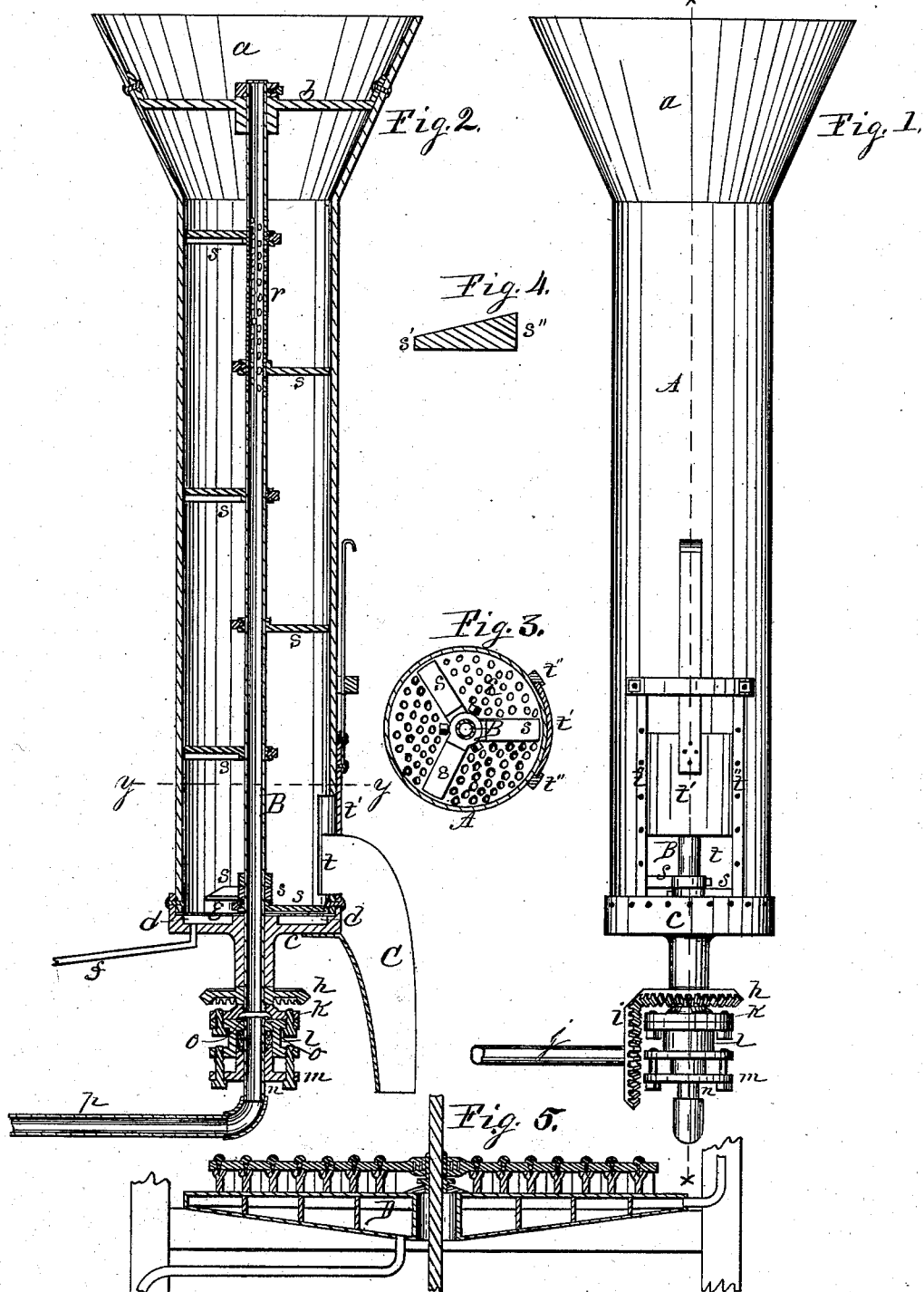

UNITED STATES PATENT OFFICE.

GEORGE H. CORMACK, OF ROCKFORD, ILLINOIS.

PROCESS OF AND APPARATUS FOR HULLING OATS.

SPECIFICATION forming part of Letters Patent No. 268,782, dated December 12, 1882.

Application filed May 25, 1880. (No model.)

*To all whom it may concern:*

Be it known that I, GEORGE H. CORMACK, of the city of Rockford, in the county of Winnebago and State of Illinois, have invented a new and useful Improvement in the Process of and Apparatus for Hulling Oats, of which the following is a specification.

Heretofore it has ordinarily been customary in hulling oats to prepare them for the grinding process to subject them to a drying process, usually upon a drying-kiln, then to pass them through the hulling-stones to loosen the hulls, and then separating the hulls from the grain by an air-blast. This process in its best practice has proven unsatisfactory and wasteful, for the reason that oat-grains vary in size and the hull adheres more closely to the small grains than to the larger grains, which fact requires the hulling-stones to be set so close that in the process many of the larger and better grains are broken, crushed, and powdered, and in the air-blast are carried to waste with the hulls. It is also found that the grain, in the growth of some seasons and under some circumstances, after this treatment is left in a toughened or gummy state, which condition, in the manufacture of oatmeal, prevents the production of clean sharp grits.

To remedy these difficulties and to produce a superior quality and increased quantity of meal or grits from a given quantity of oats is the object of my invention.

My invention consists in subjecting the oat-grains to a steaming process, then subjecting the steamed oats to a drying process, then passing them through the hullers, then subjecting them to a suitable air-blast to separate the hulls from the grain, in which state they are fitted for the grinding process to reduce them to a clean sharp grits or meal.

In carrying out my improved process I take oats as usually found in the market when properly prepared, and subject them to a steaming process in which the steam employed is of a temperature sufficient to dissolve any substance found therein which tends to cause the hulls to adhere to the grains. This steaming process also operates to expand the hulls, which expansion operates to cause the hulls to free themselves from the grain. In this state, with the hulls steamed and loosened from the grain, the oats are passed to a drying-kiln, where they are subjected to a rapid drying process, which action cause the hulls to spring from the grain and stand in an open, spreading manner. The oats, thus steamed and properly dried, are then passed through the hullers, which process disengages the hulls from the grains. The oats, with the hulls disconnected, are then subjected to an air-blast, the action of which will separate the detached hulls from the grain, which will be then in a suitable condition to be subjected to the grinding process to be manufactured into meal or grits.

In the accompanying drawings, Figure 1 is a front elevation of a vertical tubular steamer, of which Fig. 2 is a central vertical section on dotted line $x\,x$, Fig. 1. Fig. 3 is a transverse section on dotted line $y\,y$, Fig. 2, representing a plan view of the lower portion of the tubular steamer. Fig. 4 is a transverse section of one of the stirrer-arms; and in Fig. 5 is represented a vertical central section of one of the pans of a drying-kiln patented to me September 23, 1879, and numbered 219,918.

In the several figures, A represents a tubular cylinder, made from any suitable material and of a proper size, having its upper end portion enlarged with flaring walls $a$ in tunnel-mouth form. This tunnel-mouth enlargement is fitted with a transverse bearing-bar, $b$, which furnishes a bearing for the upper end portion of the central tubular shaft. The lower end of the tubular cylinder is supported in the foot-bearing $c$, to which it is fixed by means of rivets or other suitable fastening. This foot-bearing is provided on its upper face with recessed chamber $d$, over which is placed a perforated bottom plate, $e$, to permit the water of condensation to pass from the cylinder into the chamber, from which it can escape through the waste-tube $f$, which is connected therewith.

At B is represented a tubular shaft, placed in the axial center of the tubular cylinder, and is fitted to revolve therein, suitably supported in the foot-bearing, and in the cross-bar supported on the inclined walls of the tunnel-formed upper end thereof. To the lower portion of this tubular shaft, immediately under the foot-support of the cylinder, is fixed a miter-toothed gear-wheel, $h$, the teeth of which engage the teeth of a like gear-wheel, $i$, mounted on a shaft, $j$, which is designed to connect with the prime mover. The extreme lower end of the tubular shaft, immediately below the toothed gear-wheel mounted thereon, is fixed in the cap $k$ of a stuffing-box coupling, consisting of the cap $k$, the center portion, $l$, and the packing-head $m$. The vertical journal portion $n$ of the tubular shaft, which is passed through the stuffing-box, is fitted with an outward-projecting flange, $o$, adapted to enter a recess formed in the upper surface of the center section, $l$, of the stuffing-box, which, in connection with suitable packing and the packing-head $m$, forms the bearing connected with the tubular shaft, to permit it to revolve on the tubular journal $n$.

At $p$ is represented a tube, connected with the tubular journal-shaft $n$, and its free end is designed to be connected with a boiler or steam-supply, from which to receive steam to pass into the tubular shaft, a portion of which, toward its upper end, as at $r$, is perforated to permit the steam to escape into the cylinder.

At $s$ are represented radial stirrer-arms, fixed to the tubular shaft at proper intervals, and are of proper length to revolve freely within the cylinder. These radial arms in this instance are of wedge form in cross-section, as represented at Fig. 4, having a thin forward-moving edge, as at $s'$, and a thick rear edge, as at $s''$, operating in their revolutions to stir the contents of the cylinder. The cylinder is provided near its lower end with an opening, $t$, to permit the contents of the cylinder to be discharged therefrom by the action of the stirrer-arms placed on the lower portion of the tubular shaft.

At $t'$ is represented a door, fitted to move in the lengthwise direction of the cylinder in guideways $t''$, by which movement the size of the opening may be varied to regulate the discharge of the contents of the cylinder.

In practice, the oats to be subjected to my improved process are passed into the cylinder through its tunnel-formed open end to fill the cylinder. Steam is then permitted to ascend the tubular shaft and escape through the perforations in the upper portion of the tube into the cylinder to mix with the oats. Motion is then imparted to the tubular shaft, which carries with it the radial stirrers, the operation of which will discharge the oats through the opening in the lower portion of the cylinder, which discharge can be regulated by means of the vertical sliding door to insure the proper degree of steaming before the oats are passed from the cylinder. The oats, when steamed to properly loosen the hulls, are then passed from the cylinder to a suitable drying-kiln, as, in this instance, through the spout C onto pan D at Fig. 5, which is a central vertical section of the upper pan of a series employed in my patented improved drying-kiln above referred to, and to which reference is hereby made as a suitable and convenient form of kiln to be employed in carrying out my newly-invented process, and when properly dried thereon the oats are passed in any convenient manner—as through spouts, conveyers, or elevators—to a suitable hulling-machine of any of the known forms—such as the hulling-stones in common use for the purpose—to remove the hulls from the grain, and from thence through an air-current to separate the hulls from the grain, after which the grain thus freed and separated from the hulls is passed to the grinders, to be reduced to meal or grits of the grade required in the trade.

As an example of a capable machine for the reduction of the hulled oat-grains to meal or grits, among other patents issued to me for like machines, I hereby refer to the Patent No. 204,137, dated May 28, 1878, in which its capabilities and mode of operation are fully set forth; and for the purpose of this specification I do not deem it necessary to enter into a detailed description of its construction or mode of operation. In the foregoing I have represented one form of an apparatus capable of use in carrying out my improved process, but do not wish to confine myself to the particular apparatus herein described, so long as the process is substantially the same, notwithstanding other forms of apparatus may be employed to carry out the process.

I claim as my invention—

1. The herein-described process in the manufacture of oatmeal or grits, consisting of the following steps in the order named, viz: first, subjecting the oats to a steaming process; second, to a drying process; third, to a hulling and separating process; and, fourth, to a reducing process to produce the meal or grits, substantially as set forth.

2. The combination, with an upright cylinder having an exit-opening at its lower end, of a perforated tubular shaft having arms secured thereto, and devices for revolving said shaft, substantially as set forth.

3. The combination, with an upright cylinder having a hopper connected with its upper end and a discharge-spout at its lower end, of a revolving tubular shaft provided with perforations and having arms secured thereto, and a steam-supply pipe communicating with one end of said shaft, substantially as set forth.

4. The combination, with an upright cylinder having a discharge-opening at its lower end, a chamber located below the discharge-opening and adapted to receive the water of condensation, and a perforated bottom placed over said chamber, of a rotary steam-induction pipe located within the cylinder and provided with stirrer-arms for stirring the oats, substantially as set forth.

GEORGE H. CORMACK.

Witnesses:
GEO. B. FREEMAN,
A. O. BEHEL.